(12) United States Patent
Hatogai (10) Patent No.: US 8,888,376 B2
(45) Date of Patent: Nov. 18, 2014

(54) BEARING STRUCTURE

(71) Applicant: Showa Corporation, Gyoda (JP)

(72) Inventor: Ataru Hatogai, Haga-gun (JP)

(73) Assignee: Showa Corporation, Gyoda (JP)

( * ) Notice: Subject to any disclaimer, the term of this patent is extended or adjusted under 35 U.S.C. 154(b) by 44 days.

(21) Appl. No.: 13/720,197

(22) Filed: Dec. 19, 2012

(65) Prior Publication Data

US 2013/0178298 A1    Jul. 11, 2013

(30) Foreign Application Priority Data

Jan. 10, 2012 (JP) ................................ 2012-002555

(51) Int. Cl.

| F16C 27/00 | (2006.01) |
|---|---|
| F16C 33/80 | (2006.01) |
| B60K 17/24 | (2006.01) |
| F16C 27/06 | (2006.01) |
| F16F 1/38 | (2006.01) |
| F16C 3/02 | (2006.01) |
| F16C 19/06 | (2006.01) |

(52) U.S. Cl.
CPC ............... *F16C 3/02* (2013.01); *F16C 33/805* (2013.01); *B60K 17/24* (2013.01); *F16C 19/06* (2013.01); *F16C 27/066* (2013.01); *F16F 1/38* (2013.01); *F16C 2326/06* (2013.01)
USPC .......................................... 384/536; 384/480

(58) Field of Classification Search
CPC .......... F16C 3/02; F16C 27/06; F16C 27/063; F16C 27/066; F16C 33/805; F16C 2326/06; F16C 19/06; B60K 17/24; F01D 11/002

USPC ................. 384/477, 480, 535, 536, 581, 582; 277/411, 412, 417–421
See application file for complete search history.

(56) References Cited

U.S. PATENT DOCUMENTS

| 5,492,418 A * | 2/1996 | Brossard ....................... 384/536 |
| 6,276,837 B1 * | 8/2001 | Iwano ........................... 384/536 |
| 7,922,394 B2 * | 4/2011 | Hirakawa et al. ............. 384/536 |
| 8,475,052 B2 * | 7/2013 | Ostrander et al. ............ 384/484 |
| 2013/0068921 A1 | 3/2013 | Ikeda |

FOREIGN PATENT DOCUMENTS

| JP | 53-13147 U | 4/1978 |
| JP | 55-168428 U | 12/1980 |
| JP | 61-174337 U | 10/1986 |
| JP | 63-30572 Y2 | 8/1988 |
| JP | 01-018629 U | 1/1989 |

(Continued)

*Primary Examiner* — James Pilkington
(74) *Attorney, Agent, or Firm* — Leason Ellis LLP (57) ABSTRACT

A bearing structure comprises a shaft member, a bearing, an inner ring, a ring-shaped mount which is made of an elastic material, is fixed to a vehicle body and encloses the inner ring, and a dust cover which is fixed to the bearing member and rotates in unison with the bearing member, the bearing member being supported rotatably on the vehicle body via the bearing. The mount includes, on a front side, a rib facing inward in a radial direction and extending in a circumferential direction so as to seal off a first gap formed between the shaft member and the inner ring. A second gap is formed between an inner radial end of the rib and the shaft member. The dust cover covers the rib and the second gap on the front side of the rib. A cutout is formed in a lower vertical portion of the rib.

2 Claims, 9 Drawing Sheets

(56) References Cited

FOREIGN PATENT DOCUMENTS

| | | |
|---|---|---|
| JP | 01-119921 U | 8/1989 |
| JP | 02-025774 A | 1/1990 |
| JP | 02-025774 U | 2/1990 |
| JP | 02-094920 U | 7/1990 |
| JP | 05-32071 U | 4/1993 |
| JP | 07-00336 Y2 | 1/1995 |
| JP | 07-016027 U | 3/1995 |
| JP | 07-101256 A | 4/1995 |
| JP | 10-100695 A | 4/1998 |
| JP | 10-230751 A | 9/1998 |
| JP | 10-230752 A | 9/1998 |
| JP | 2586450 Y2 | 10/1998 |
| JP | 2001-280342 A | 10/2001 |
| JP | 2006-250251 A | 9/2006 |
| JP | 2008-208903 A | 9/2008 |
| JP | 2009-006990 A | 1/2009 |
| JP | 2010-269716 A | 12/2010 |
| JP | 2013-064438 A | 4/2013 |

* cited by examiner

BEARING STRUCTURE

CROSS-REFERENCE TO RELATED PATENT APPLICATIONS

This application claims the benefit of Japanese Patent Application No. 2012-002555, filed Jan. 10, 2012, which is incorporated by reference herein.

FIELD OF THE INVENTION

The present invention relates to a bearing structure of a bearing which rotatably supports a propeller shaft of a vehicle.

BACKGROUND OF THE INVENTION

In general, in a rear wheel drive or four-wheel drive four-wheel vehicle, motive power from a transmission device is transmitted to a final reduction gear device provided in the center of left and right rear wheels, via a propeller shaft which extends in a front/rear direction in the center of the vehicle width direction. Here, a critical speed of the propeller shaft needs to be set higher than a practical rotational speed range, and therefore the propeller shaft is divided into appropriate lengths.

Figure 8:
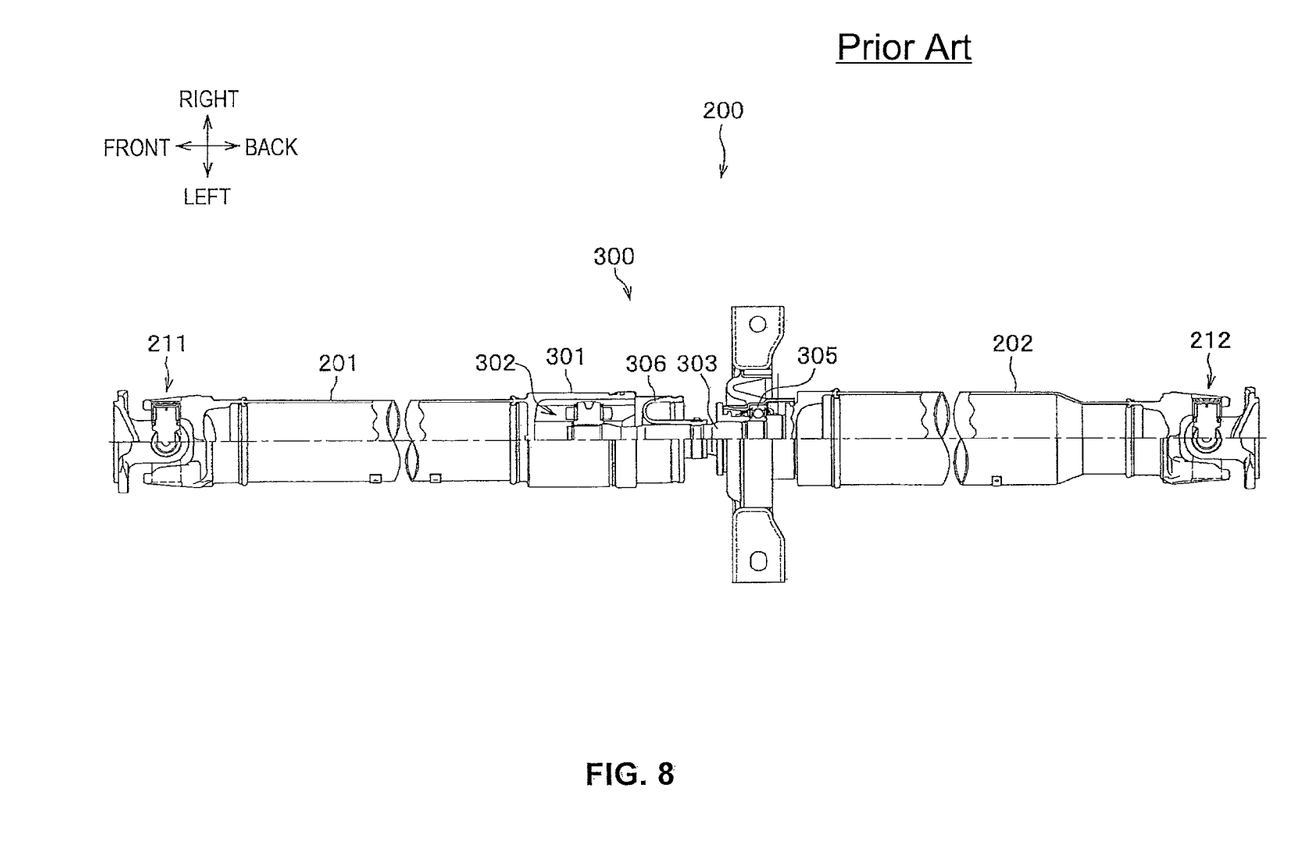
FIG. 8 is a plan view of a conventional propeller shaft.

For example, if the propeller shaft is divided into two pieces, then as shown in FIG. 8, the propeller shaft 200 is constituted by a first shaft 201 on the front side (one side), a second shaft 202 on the rear side (other side), and a constant-velocity joint 300 which couples the first shaft 201 and the second shaft 202. A front end portion of the first shaft 201 is connected to an output shaft (not illustrated) of the transmission device via a first universal joint 211 (cross joint, etc.), and a rear end portion of the second shaft 202 is connected to a drive pinion (not illustrated) of the final reduction gear device via a second universal joint 212.

Figure 9:
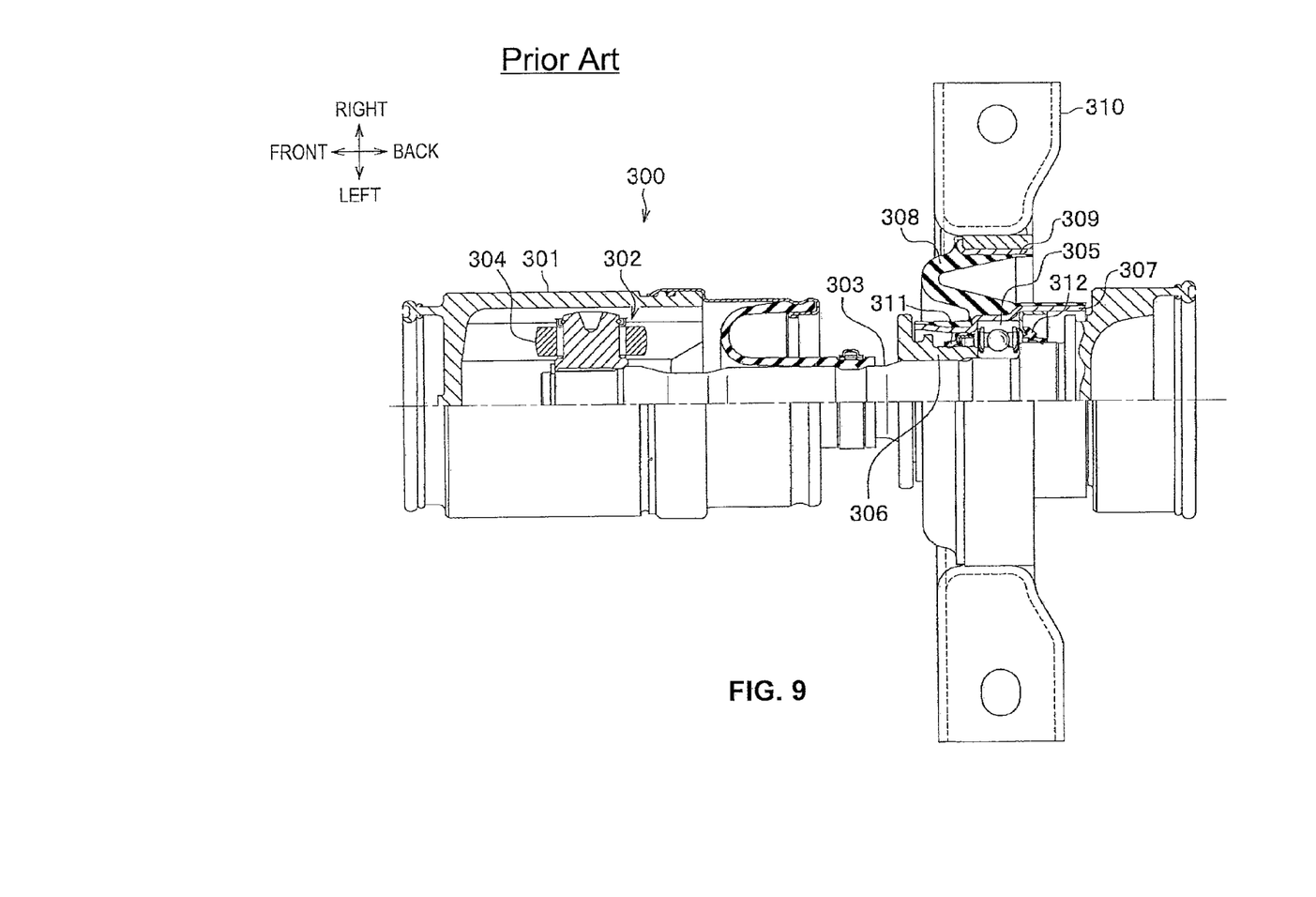
FIG. 9 is a plan view of a conventional constant-velocity joint.

As shown in FIG. 9, the constant-velocity joint 300 is a tripod type joint and is constituted by a bottomed round tubular outer ring 301 which is coupled to a rear end portion of the first shaft 201, a trunnion assembly 302 which slides in an axial direction inside the outer ring 301, and a shaft member 303, a front end portion of which is coupled to the trunnion assembly 302 and a rear end portion of which is coupled to a front end portion of the second shaft 202. A roller 304 of the trunnion assembly 302 slides or rolls along a sliding groove formed in an axial direction in an inner circumferential surface of the outer ring 301, whereby the outer ring 301 and the shaft member 303 extend and contract in the axial direction.

Here, the shaft member 303 is supported rotatably by a bearing 305 which is constituted by a ball bearing. The bearing 305 is prevented from detaching from the shaft member 303 by a stopper 306 having an L-shaped cross-section which is fixed to the shaft member 303.

The bearing 305 is fixed to a vehicle body (exterior) via an inner ring 307 (ring-shaped member), a mount 308 (ring-shaped elastic body, shock-absorbing rubber), an outer ring 309 and a bracket 310. The mount 308 is made of rubber and absorbs vibrations produced by imbalances in the propeller shaft 200 and vibrations produced by secondary couples of the universal joint.

Furthermore, a dust seal 311 and a dust seal 312 are provided at the front and rear of the bearing 305, so as to prevent the infiltration of water, dust or the like into the bearing 305. Lubricating grease for lubricating the bearing 305 is sealed in between the dust seal 311 and the dust seal 312.

Here, since the stopper 306 (shaft member 303) rotates and the inner ring 307 does not rotate, in front of the dust seal 311 (bearing 305), then the stopper 306 cannot abut against the inner ring 307 and hence the front side of the ring-shaped space formed between the stopper 306 and the inner ring 307 cannot be sealed off completely. Therefore, although it is considered that water, dust and the like, can readily infiltrate due to the provision of members which reduce the open portion of this space (the gap formed between the stopper 306 and the inner ring 307) as much as possible, since water which splashes up from the front wheels has a high pressure, there are cases where water and dust infiltrate through this gap. Therefore, technology of the following kind has been proposed.

In Japanese Examined Utility Model Application Publication No. S53-13147 and Japanese Patent Application Publication. No. 2008-208903, a lip (projection) is formed extending inward in a radial direction on a mount, and a front end of an inner radial side of the lip is made to contact a bearing member. In Japanese Unexamined Utility Model Application Publication No. S55-168428, a projection is formed in an integrated shape with a shock-absorbing rubber (mount), and the front end of the projection is inserted into a groove in a bearing member. In Japanese Patent Application Publication No. H7-101256, a front end of a steel inner ring is bent towards an inner radial side, thereby reducing the size of an opening portion. In Japanese Unexamined Utility Model Application Publication No. H1-119921, a lip extending outward in a radial direction is bonded by cure adhesion to a front end of an inner ring, and an outer radial end of the lip slides over a receiving member which rotates in unison with a shaft member, thereby preventing infiltration of water.

However, in the technology described in Japanese Examined Utility Model Application Publication No. S53-13147 and Japanese Patent Application Publication No. 2008-208903, since the lip and shaft member make contact, then there is a risk of abnormal noise occurring with the rotation of the shaft member. Furthermore, if the front end of the lip becomes worn, then a gap is formed between the lip and the shaft member, and there is a risk of water infiltrating through this gap. Moreover, since the lip is formed with a small thickness, then there is a risk of the lip deforming due to the water which splashes up from the front wheels, leading to infiltration of water.

Moreover, in the technology according to Japanese Unexamined Utility Model Application Publication No 555-168428, the groove in the shaft member becomes rusted due to the water, the depth and width of the groove decrease, and hence the gap between the groove and the projection becomes smaller, leading to a risk of abnormal noise.

Furthermore, in the technology according to Japanese Patent Application Publication No. H7-101256, since the inner ring and the rubber mount are bonded by cure adhesion, surface treatment of the inner ring is not possible. Therefore, rusting occurs on the exposed portions of the inner ring, and there is a risk of contact between the shaft member and portions of the inner ring that have expanded due to the rust.

Moreover, in Japanese Unexamined Utility Model Application Publication No. H1-119921, since the surface of the inner ring makes contact with the outside air, rusting occurs, and if this rust progresses to the interface between the lip and the inner ring, then the lip detaches from the inner ring, the gap becomes large, and there is a risk of infiltration of water.

In addition, in Japanese Examined Utility Model Application Publication No. S53-13147, Japanese Patent Application Publication No. 2008-208903, Japanese Unexamined Utility Model Application Publication No. S55-168428, Japanese Patent Application Publication No. H7-101256 and Japanese Unexamined Utility Model Application Publication No. H1-119921, when the vehicle travels through puddles, and so on, and the bearing is immersed in water, then water collects between the inner ring and the outer ring, and a problem arises in that this water cannot be readily discharged to the outside.

Therefore, it is an object of the present invention to provide a bearing structure in which the occurrence of abnormal noise and rusting is prevented, muddy water cannot readily infiltrate into one side of the bearing, and muddy water in the one side of the bearing is discharged to the outside in a satisfactory, manner.

SUMMARY OF THE INVENTION

In order to achieve the aforementioned object, the present invention is a bearing structure including: a shaft member which rotates and extends in a horizontal direction; a bearing which fits externally onto the shaft member; a ring-shaped member which is arranged on an outer radial side of the bearing; a ring-shaped elastic body which is made of an elastic material, is fixed to an external part and encloses the ring-shaped member; and a cover member which is fixed to the shaft member and rotates in unison with the shaft member, the shaft member being supported rotatably on the external part via the bearing, wherein the ring-shaped elastic body includes, on one side in an axial direction, a rib which faces inward in the radial direction and extends in circumferential direction so as to seal off a first gap formed between the shaft member and the ring-shaped member, a second gap is formed between an inner radial end of the rib and the shaft member, the cover member faces outward in the radial direction and extends in the circumferential direction so as to cover the rib and the second gap on the one side from the rib, and a cutout is formed in a lower vertical portion of the rib which extends in the circumferential direction.

Here, "the ring-shaped elastic body encloses the ring-shaped member" means that the ring-shaped elastic body which is made of an elastic material such as rubber covers the ring-shaped member.

Therefore, according to this composition, although the ring-shaped member is generally made of metal, it does not rust due to being covered by the ring-shaped elastic body.

Furthermore, "the cover member covers the rib and the second gap" means that the cover member, the rib and the second gap are mutually overlapping when viewed in the axial direction.

According to a composition of this kind, since a rib which faces inward in the radial direction and extends in the circumferential direction seals off the first gap formed between the shaft member and the ring-shaped member, on the one side of the axial direction, then the muddy water cannot readily pass through the first gap and cannot readily infiltrate into the front side of the bearing.

Furthermore, since the second'gap is formed between the inner radial end (front end) of the rib and the shaft member, in other words, since the inner radial end of the rib is separated from the shaft member in the radial direction and the rib does not contact the shaft member, then the rib does not rub against the shaft member and abnormal noise due to such rubbing contact is not generated.

Moreover, since the cover member which is fixed to the shaft member faces outward in the radial direction and extends in the circumferential direction so as to cover the rib and the second gap on the one side from the rib, then the muddy water cannot readily pass through the second gap and cannot readily infiltrate into the one side of the bearing.

Furthermore, since the cover member covers the rib, then the muddy water, which splashes up from the front wheels is shut off by the cover member and cannot readily strike the rib directly, and hence the rib is not liable to deform.

Moreover, since a cutout is formed in a lower vertical portion of the rib which extends in the circumferential direction, then even if the bearing and the like is immersed in water due to the vehicle travelling through a puddle, for instance, then the light, such as water inside the bearing is reliably discharged to the outside via the cutout when the vehicle subsequently moves out of the puddle.

Furthermore, in the bearing structure described above, desirably, the inner circumferential surface of the ring-shaped elastic body in the portion where the cutout is formed has a downward gradient towards the one side, in a sectional side view.

According to a composition of this kind, the inner circumferential surface of the ring-shaped elastic body in the portion where the cutout is formed has a downward gradient towards the one side, in a sectional side view, and therefore the muddy water is rapidly discharged to the outside.

According to the present invention, it is possible to provide a bearing structure in which the occurrence abnormal noise and rusting is prevented, muddy water cannot readily infiltrate into the front side of the bearing, and muddy water in the one side of the bearing is discharged to the outside in a satisfactory manner.

DETAILED DESCRIPTION OF THE INVENTION

Preferred Embodiments

One embodiment of the present invention is described now with reference to FIG. 1 to FIG. 7.

Composition of Propeller Shaft

Figure 1:
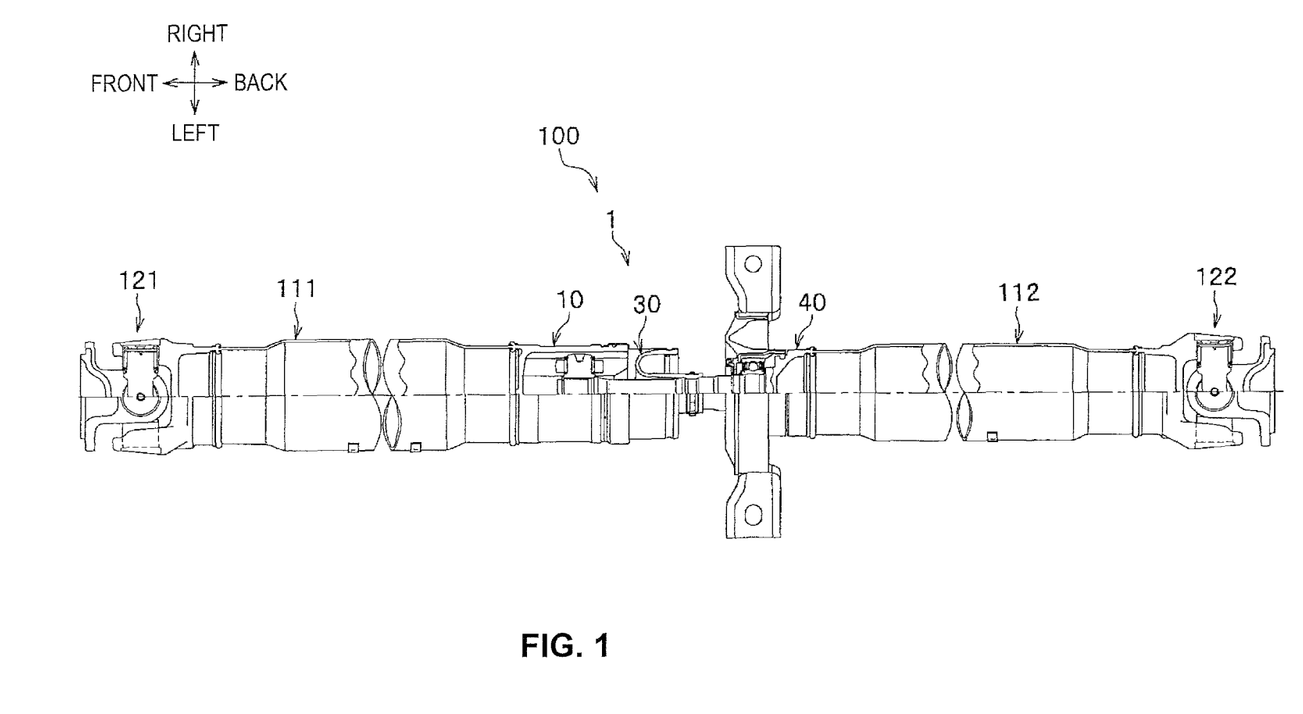
FIG. 1 is a plan view of a propeller shaft relating to an embodiment of the present invention.

A propeller shaft 100 relating to the present embodiment is mounted in a rear wheel drive four-wheel vehicle, and is an axle extending in a front/rear direction (horizontal direction) which transmits drive force output by a transmission device (not illustrated) arranged on a front side of the vehicle, to a final reduction gear device (not illustrated) arranged on a rear side of the vehicle in the center of the vehicle width direction.

The propeller shaft 100 has a two-piece structure (two-division structure) and includes a first shaft 111 on the front side (one side), a second shaft 112 on the rear side (other side), a constant-velocity joint 1 which couples together the first shaft 111 and the second shaft 112, and a bearing structure (intermediate bearing) which rotatably supports the propeller shaft 100.

Here, the number of pieces (number of divisions) is not limited to this and may be changed appropriately to a three-piece structure (three-division structure) or the like.

The first shaft 111 is a round tubular component. A front end portion of the first shaft 111 is coupled to an output shaft (not illustrated) of a transmission device, via a first universal joint 121 (cross joint or the like).

The second shaft 112 is a round tubular component. A rear end portion of the second shaft 112 is coupled to a drive pinion (not illustrated) of a final reduction gear device, via a second universal joint 122 (cross joint or the like).

Composition of Constant-Velocity Joint

Figure 2:
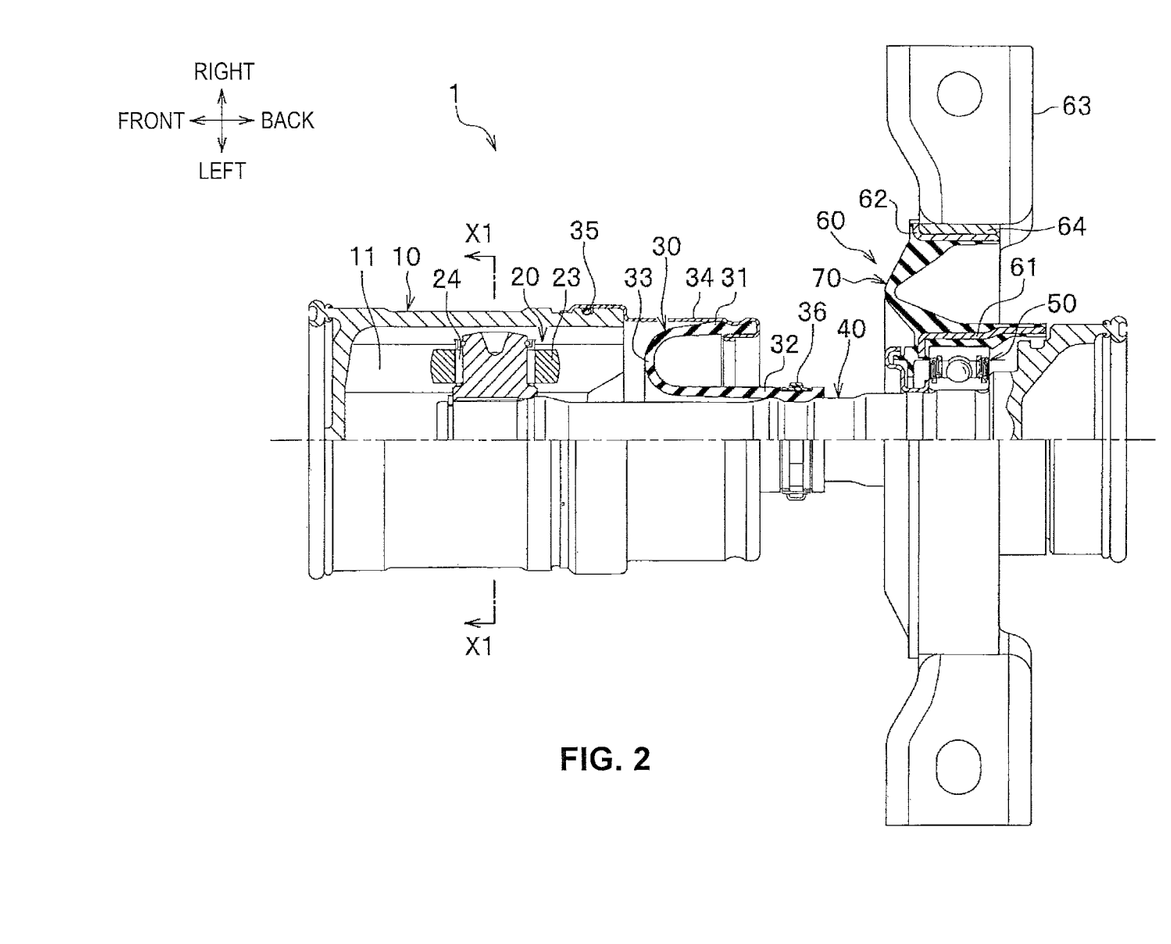
FIG. 2 is a plan view of a constant-velocity joint and a center support bearing relating to the present embodiment.

The constant-velocity joint 1 is a joint which couples the rear end portion of the first shaft 111 with the front end portion of the second shaft 112, and in the present embodiment is constituted in a tripod configuration.

As shown in FIG. 2, the tripod type constant-velocity joint 1 includes a bottomed round tubular outer ring 10, of which the rear end side is open, a trunnion assembly 20 which slides inside the outer ring 10 in an axial direction, and a boot 30.

Outer Ring

The outer ring 10 is a bottomed round tubular shape which is open on the rear end side and has a bottom wall portion on the front end side. The front end portion of the outer ring 10 is connected to the rear end portion of the first shaft 111, by welding (friction welding or the like). Consequently, the outer ring 10 rotates in unison with the first shaft 111.

Three sliding grooves 11 which extend in an axial direction and are open on the rear end side are formed in the inner circumferential surface of the outer ring 10. The three sliding grooves 11 are arranged at even intervals apart in the circumferential direction (see FIG. 6). Therefore, rollers 23 (described below) of the trunnion assembly 20 slide or roll along the respective sliding grooves 11.

Trunnion Assembly

Figure 6:
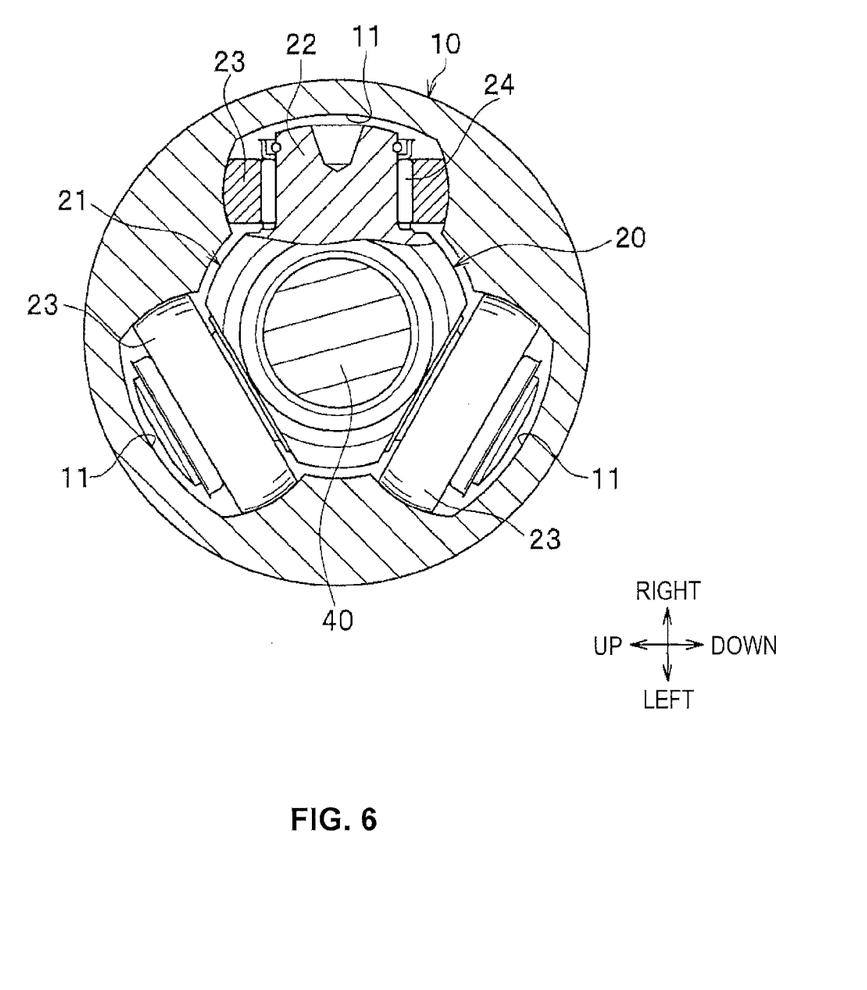
FIG. 6 is a cross-sectional view along line X1-X1 in FIG. 2.

As shown in FIG. 6, the trunnion assembly 20 includes a ring-shaped external fitting section 21 which fits externally onto and spline couples with the front end portion of the shaft member 40, three shaft sections 22 which are formed in an integrated shape with the external fitting section 21, extend in a radial direction and are arranged at even intervals apart in the circumferential direction, rollers 23 (sliding elements) which rotate about the respective shaft sections 22, and bearings 24 which are provided between the shaft section 22 and the roller 23. The bearings 24 are constituted by needle roller bearings, for example.

The rollers 23 slide or roll in an axial direction along the sliding grooves 11, while forming a minimal gap with respect to the inner wall surfaces of the sliding grooves 11. In order to prevent abrasion or sticking of the rollers 23 and sliding grooves 11 as a result of the sliding action and the like, grease (lubricating oil) is filled in the constant velocity joint 1.

Boot

As shown in FIG. 2, the boot 30 is a component having a ring shape, which seals a gap between the rear side opening of the outer ring 10 and the shaft member 40, thereby (1) preventing external outflow of grease from the constant velocity joint 1, and also (2) preventing infiltration of muddy water, into the outer ring 10.

The boot 30 includes a boot large diameter section 31, a boot small diameter section 32 and a boot bend section 33. The boot large diameter section 31, the boot small diameter section 32 and the boot bend section 33 are made of rubber and are formed in an integrated shape.

The boot large diameter section 31 has an outer diameter substantially equal to that of the outer ring 10 and is fixed to the outer ring 10 via a round tubular adapter 34. More specifically, the rear end portion of the boot large diameter section 31 is inserted into a fold back portion on the rear end side of the adapter 34, and the front end portion of the adapter 34 is fitted into the outer ring 10. An O ring 35 is interposed between the adapter 34 and the outer ring 10, thereby raising the sealing properties.

The boot small diameter section 32 has a smaller diameter than the boot large diameter section 31 and is fitted onto the shaft member 40. Furthermore, the boot small diameter section 32 is fastened by a boot band 36 from the outer radial side, and the boot small diameter section 32 and the shaft member 40 are well fastened in tight contact.

The boot bend section 33 is a bendable portion which has a lateral U shape in cross-sectional view and is formed between the front end of the boot large diameter section 31 and the front end of the boot small diameter section 32. Therefore, the boot large diameter section 31 and the boot small diameter section 32 can change relative positions freely in the axial direction and the radial direction.

Composition of Bearing Structure (Intermediate Bearing)

Figure 3:
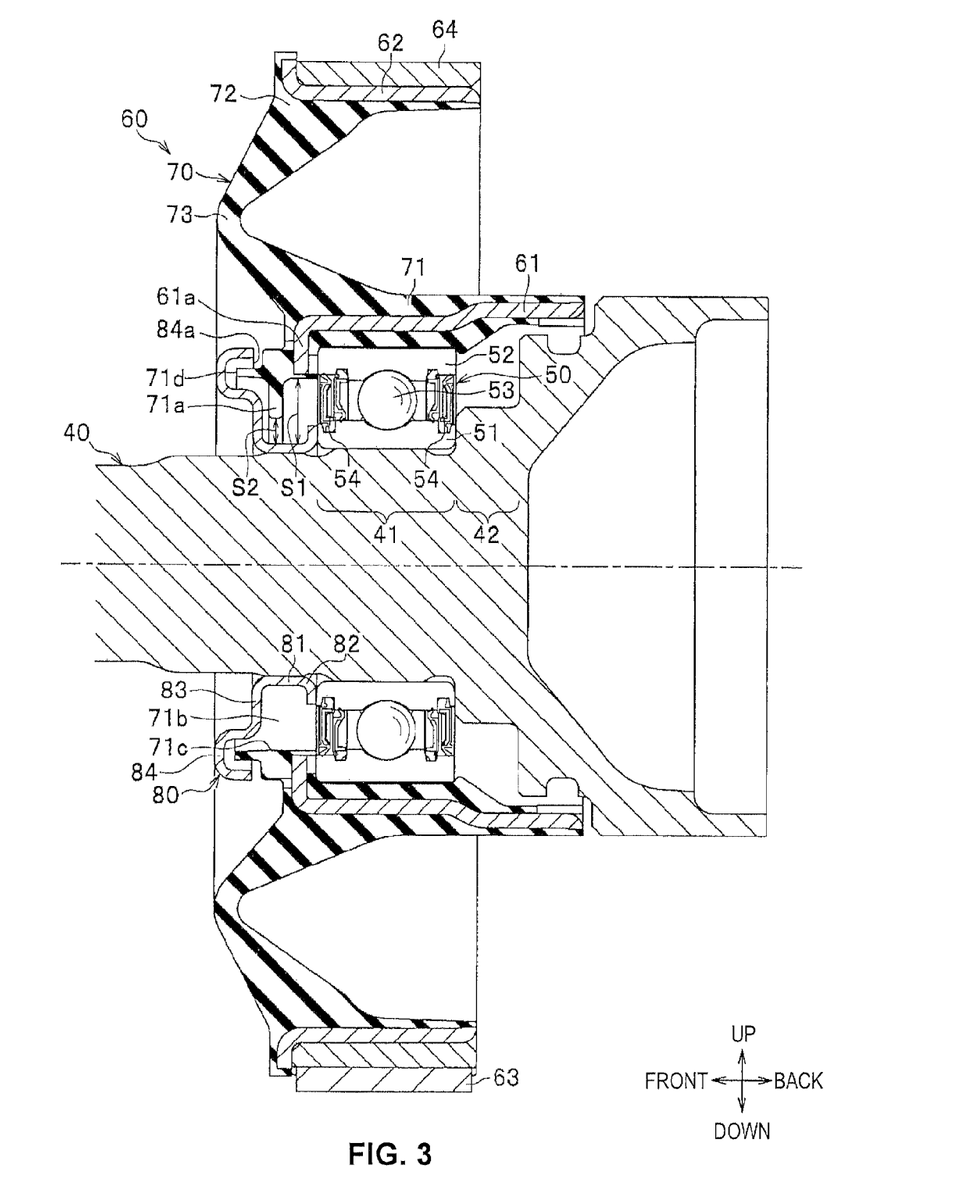
FIG. 3 is a sectional side view (vertical cross-sectional view) of a center support bearing relating to the present embodiment.

The bearing structure includes a shaft member 40, a bearing 50, an inner ring 61 (ring-shaped member), a mount 70 (ring-shaped elastic body, shock-absorbing rubber), and a dust cover 80. The inner ring 61 (ring-shaped member), the outer ring 62 and the mount 70 are integrated and formed into one component so as to constitute a mount unit 60.

Shaft Member

As shown in FIG. 2 and FIG. 3, the shaft member 40 has a round cylindrical outer shape and a metal core, and extends in the horizontal direction. The shaft member 40 may be changed to a round tubular shape or the like, as appropriate.

Approximately one third of the front portion of the shaft member 40 is inserted idly inside the outer ring 10, and approximately two thirds of the rear portion of the shaft member 40 projects from the rear side opening of the outer ring 10 and extends rearwards.

The rear end portion of the shaft member 40 is connected to the second shaft 112 by welding (frictional welding or the like). Therefore, the shaft member 40 rotates in unison with the second shaft 112. On the other hand, the front end portion of the shaft member 40 is connected with the trunnion assembly 20 by spline coupling with the external fitting section 21 of the trunnion assembly 20, as stated previously. Consequently, the drive force (rotational force) of the first shaft 111 is transmitted to the second shaft 112 via the outer ring 10, the trunnion assembly 20 and the shaft member 40.

The shaft member 40 has a supported section 41 slightly to the rear side of the center. The supported section 41 is fitted into the bearing 50 and is supported rotatably by the bearing 50.

The shaft member 40 has an enlarged diameter section 42 in which the diameter becomes larger in a step difference on the rear side of the supported section 41. The enlarged diameter section 42 abuts against the rear surface of the inner race 51 of the bearing 50. More specifically, the bearing 50 is sandwiched between the enlarged diameter section 42 and a stopper section 82 (described below) of the dust cover 80, in the axial direction, whereby the bearing 50 is registered in position with respect to the shaft member 40 and is prevented from becoming detached (see FIG. 3).

Bearing

The bearing 50 is constituted by a shielded radial ball bearing, for example, and includes an inner race 51, an outer race 52, a ball 53 (rolling body) which is provided between the inner race 51 and the outer race 52, and shields 54 which are provided respectively to the front and rear of the ball 53 and are also sandwiched between the inner race 51 and the outer race 52 in the radial direction. Grease (lubricating oil) for lubricating the ball 53 is filled in between the shields 54.

The bearing 50 is not limited to this, however, and may be, composed in a shield-less configuration, with oil seals (dust seals) being provided to the front and rear of the bearing 50.

The inner race 51 fits externally onto the supported section 41 and the outer race 52 fits internally into the inner ring 61.

Mount Unit

Figure 7:
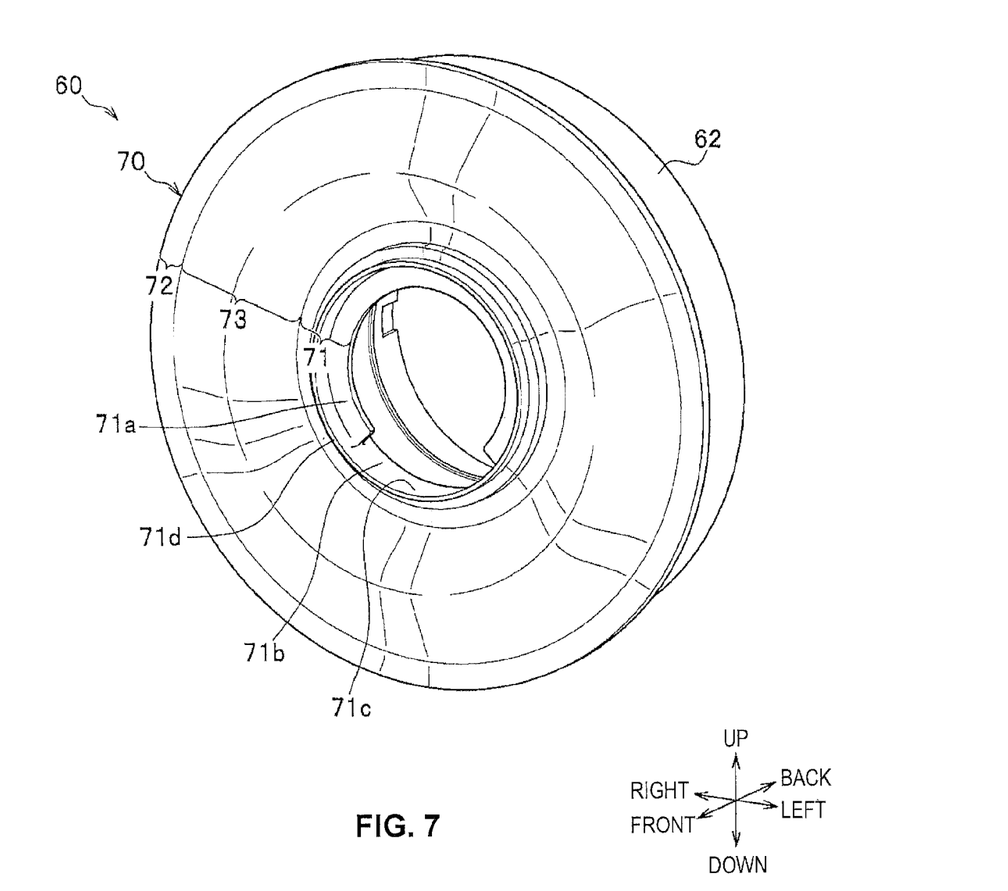
FIG. 7 is a perspective view of a mount relating to the present embodiment.

As shown in FIG. 7, the mount unit 60 is a component having a ring shape which includes the inner ring 61, the outer ring 62 and the mount 70, as described above. The inner ring 61, the outer ring 62 and the mount 70 are composed in an integrated shape by insert molding, and the mount 70 covers (encompasses) the whole of the inner ring 61. Therefore, the inner ring 61 is not liable to rust. The inner ring 61 and the outer ring 62 are made of metal, and the mount 70 is made of rubber (an elastic body). In other words, the rubber mount is bonded to the inner ring 61 and the outer ring 62 by cure adhesion.

Inner Ring

Figure 4:
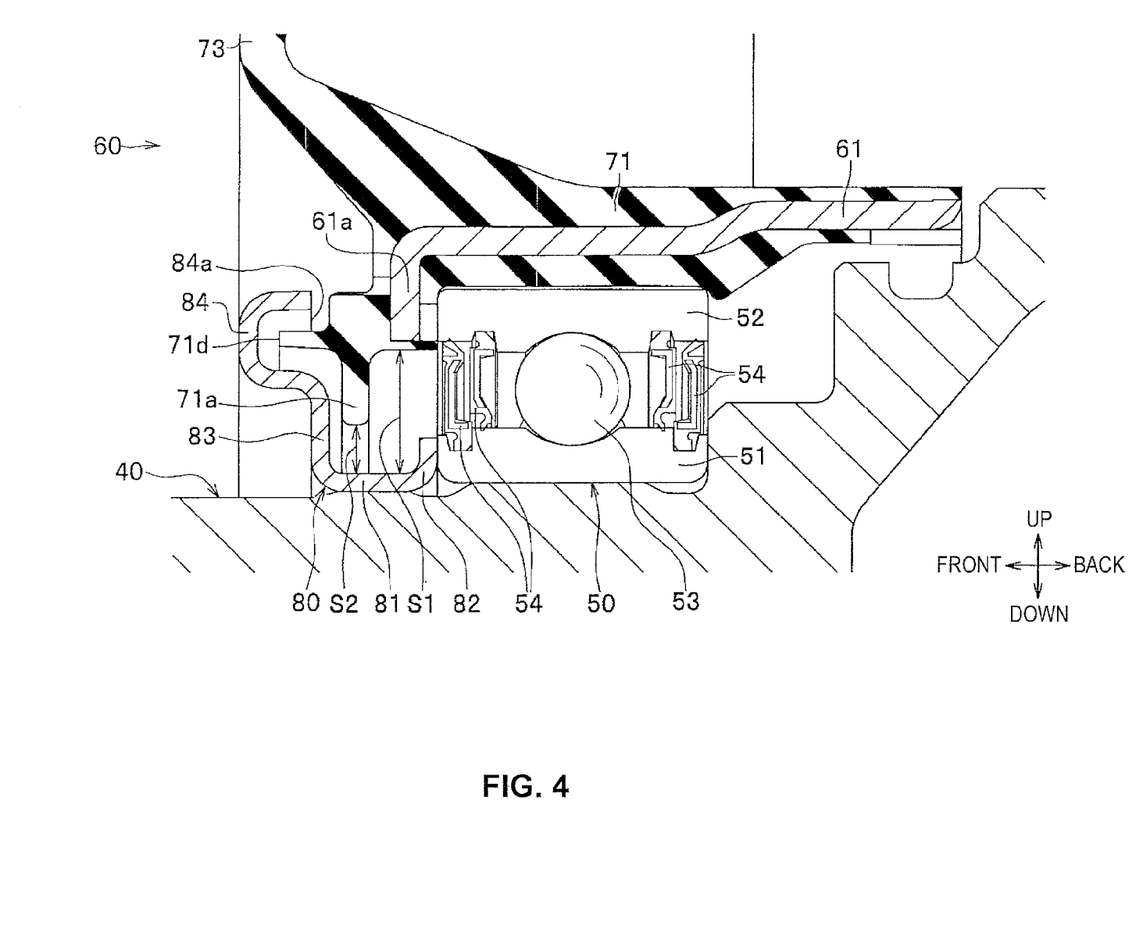
FIG. 4 is an enlarged view of an upper side portion of a sectional side view of a center support bearing relating to the present embodiment.

The inner ring 61 is a component having a round tubular shape (ring shape), which is concentric with and arranged on the outer radial side of the bearing 50, as well as being enclosed by the mount 70. The inner ring 61 fits externally onto the bearing 50 (outer race 52) via a portion of the mount 70. Furthermore, a ring-shaped first gap S1 is formed between the inner ring 61 and the dust cover 80 (shaft member 40) when viewed in the axial direction.

The front end of the inner ring 61 is bent back inward in the radial direction so as to compose a ring-shaped flange section 61a. The flange section 61a which extends inward in the radial direction functions as a core member of a rib 71a, which is described hereinafter.

Outer Ring

The outer ring 62 is a component having a round tubular shape (ring-shape) of larger diameter than the inner ring 61, and is arranged concentrically with the inner ring 61, at a prescribed interval therefrom to the outer radial side. The outer ring 62 is fixed to the lower portion of a vehicle body (exterior) (not illustrated) via a bracket 63 which has an approximate C shape when viewed in the axial direction. A collar 64 having a round tubular shape is provided between the outer ring 62 and the bracket 63.

Mount

The mount 70 is a ring-shaped component which is formed in an integrated shape from rubber (an elastic body), as stated previously, and the mount 70 is provided between the inner ring 61 and the outer ring 62 and also couples the inner ring and the outer ring 62 together in the radial direction. Consequently, vibration in the inner ring 61 (shaft member 40) is absorbed by the mount 70 and is not readily transmitted to the outer ring 62 (vehicle body). The outer ring 62 is fixed to the mount 70 by insert molding, and because the outer ring 62 is fixed to the vehicle body via the bracket 63, then the mount 70 does not rotate.

The mount 70 of this kind includes a mount small diameter section 71, a mount large diameter section 72, and a mount bend section 73.

Mount Small Diameter Section

The mount small diameter section 71 has a round tubular shape formed by material of large thickness, and the inner ring 61 is enclosed inside the circumferential wall of the mount small diameter section. A rib 71a which extends inward in the radial direction and also extends in a circumferential direction is provided on the front side of the mount small diameter section 71. The rib 71a seals off the first gap S1 which is formed between the shaft member 40 and the inner ring 61 to the front of the bearing 50, when viewed in the axial direction.

Muddy water, which splashes up from the front wheels and then travels rearwards during forward movement of the vehicle, cannot readily infiltrate into the gap formed between the rib 71a and the dust cover 80, cannot readily reach the first gap S1, and consequently, cannot readily infiltrate onto the front surface of the bearing 50.

Furthermore, the inner radial end (front end) of the rib 71a is separated from and does not make contact with the dust cover 80, which rotates together with the shaft member 40, in the radial direction. In other words, a second gap S2 is formed between the inner radial end of the rib 71a and the dust cover 80 (shaft member 40). Therefore, even if the shaft member 40 and the dust cover 80 rotate, abnormal noise does not occur and the durability and corrosion resistance of the rib 71a are increased.

Figure 5:
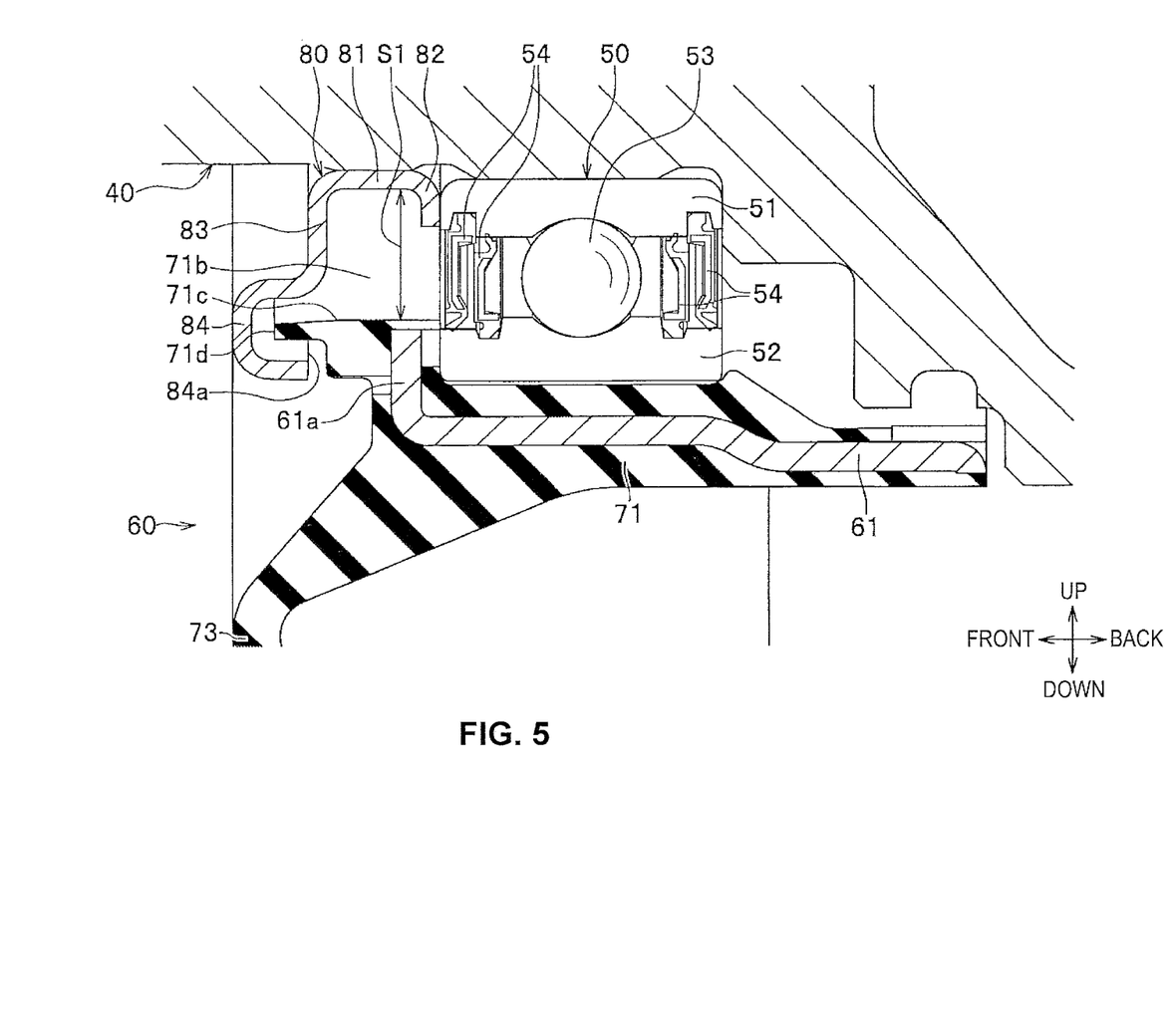
FIG. 5 is an enlarged view of a lower side portion of a sectional side view of a center support bearing relating to the present embodiment.

However, a cutout 71b (opening section) is formed in the rib 71a by cutting away approximately one quarter of the circumferential direction of the rib 71a in the lower vertical part thereof. In other words, spaces to the front and rear of the rib 71a in the axial direction are connected via the cutout 71b. Therefore, even supposing that water or mud passes over the rib 71a and infiltrates into the bearing 50, this infiltrated muddy water is discharged to the outside via the cutout 71b. Possible cases where the muddy water passes over the rib 71a might be, for instance, when the vehicle travels through a puddle, and the mount 70 and the like is immersed in water, or when water adhering to the floor panel drips off while the vehicle is stationary, and flows in via the gaps.

In other words, even if the bearing 50 and the like is immersed in water due to the vehicle travelling through a puddle, for instance, when the vehicle subsequently leaves the puddle, the water inside the bearing 50 (in the first gap S1, etc.) is reliably discharged to the outside through the cutout 71b.

The inner circumferential surface 71c of the mount small diameter section 71 in the portion where the cutout 71b is formed has a downward gradient (tapered surface) towards the front side (one side) (see FIG. 5). Consequently, the water on the side of the bearing 50 is rapidly discharged to the outside. The inner circumferential surface 71c with a downward gradient of this kind is easily molded by using, for instance, the parting line (mold separating portion, male mold and female mold mating portion) of the molding dies (male mold and female mold) which are used to form the mount 70. Moreover, it is also possible to form a plurality of water expelling grooves extending in an axial direction, in the inner circumferential surface 71c, so as to promote the expulsion of muddy water.

Furthermore, the mount small diameter section 71 projects to the forward side (to one side) from the rib 71a in cross sectional view (see FIG. 3 to FIG. 5), and has a ring-shaped projecting section 71d when viewed in the axial direction (front view) (see FIG. 7).

Mount Large Diameter Section

The mount large diameter section 72 is a round tubular portion which has a larger diameter than the mount small diameter section 71. The outer ring 62 is fixed in an integrated shape on the outer circumferential surface of the mount large diameter section 72.

Mount Bend Section

The mount bend section 73 is formed between the mount small diameter section 71 and the mount large diameter section 72, and is a bendable portion having a lateral V shape in cross-sectional view. Therefore, the relative positions of the mount small diameter section 71 and the mount large diameter section 72 can be changed in the axial direction and the circumferential direction.

Dust Cover

The dust cover 80 (cover member) is a metal component having a ring shape. The dust cover 80 includes a press insert section 81, a stopper section 82, a first cover section 83 and a second cover section 84.

The press insert section 81 has a round tubular shape and is fixed to the shaft member 40 by press insertion. Consequently, the dust cover 80 rotates in unison with the shaft member 40. However, another fixing method based on welding or the like may also be employed.

The stopper section 82 has a ring shape and extends outward in the radial direction from the rear end of the press insert section 81. The stopper section 82 abuts against a front surface of the inner race 51 of the bearing 50, in such a manner that the bearing 50 does not become detached from the shaft member 40.

However, it is also possible to adopt a composition in which the dust cover 80 does not have a stopper section 82 and a separate stopper collar abuts against the inner race 51.

First Cover Section

The first cover section 83 has a ring shape and extends outward in the radial direction from a front end of the press insert section 81. The first cover section 83 is arranged at a prescribed interval on the front side of the rib 71a, and covers the rib 71a and the second gap S2 on the front side of the rib 71a. More specifically, when viewed in the axial direction, the first cover section 83, the rib 71a and the second gap S2 are partially overlapping. Consequently, muddy water at high pressure created by splashing up from the tires strikes the first cover section 83, and this water does not readily pass through the second gap S2 and does not directly strike the rib 71a. Consequently, there is no deformation of the rubber rib 71a due to the water that splashes up.

Moreover, in the axial direction, desirably, the interval between the first cover section 83 and the rib 71a is as small as possible. This is because, the smaller this interval, the higher the pressure inside the inner ring 61, the less readily water and the like can infiltrate via the opening 84a, and the greater the reduction in the amount of muddy water directed towards the rib 71a. On the other hand, desirably, the interval between the rib 71a and the bearing 50 is made as large as possible. This is because by making this interval large, the volume of the ring-shaped space formed between the rib 71a and the bearing 50 becomes larger, and the heat of the bearing 50 is radiated well.

Second Cover Section

The second cover section 84 is a portion which is formed extending from the outer radial end of the first cover section 83, and in cross-sectional view, has a lateral U shape so as to cover the ring-shaped projecting section 71d of the mount 70 described above, from the front side. The lateral U-shaped second cover section 84 covers the ring-shaped projecting section 71d while maintaining a prescribed interval therefrom. In other words, the second cover unit 84, which rotates, does not make contact with the ring-shaped projecting section 71d, which does not rotate, and frictional heat does not occur between the second cover section 84 and the ring-shaped projecting section 71d.

The space (gap) formed between the second cover section 84 and the ring-shaped projecting section 71d has a lateral U shape and the outward opening 84a of this space faces to the rear side (see FIG. 3 to FIG. 5). Therefore, muddy water is not liable to infiltrate into this space via the opening 84a which faces to the rear side. Furthermore, even supposing that water or mud were to infiltrate therein, since the space has a U shape, in other words, a labyrinthine structure (a fold back structure), then the water and the like is not liable to reach the rib 71a by passing through the space.

Action and Beneficial Effects of Bearing Groove Structure (Intermediate Bearing)

According to a bearing structure of this kind, the following action and beneficial effects are obtained.

Since the first cover section 83 of the dust cover 80 covers the rib 71a and the second gap S2, then muddy water splashed up from the front wheels is shut out by the first cover section 83 and hence cannot readily strike the rib 71a directly and cannot readily deform the rib 71a.

Furthermore, since the inner radial end of the rib 71a is separated from the dust cover 80, then abnormal noise is not generated as the dust cover 80 (bearing member 40) rotates, and the rib 71a is not worn.

Furthermore, even if water infiltrates into the first gap S1, due to immersion in water or water dripping down, the water in the first gap S1 is readily discharged to the outside via the cutout 71b which is formed in the lower vertical part of the rib 71a.

Furthermore, the first gap S1 is formed by a rib 71a (mount 70) made of rubber which does not decline in corrosion resistance, and hence the metal inner ring 61 is enclosed in the mount 70 without being exposed, and does not make contact with the outside air. Consequently, the corrosion resistance of the inner ring 61 is raised and the durability of the inner ring 61 does not decline due to rusting.

Modification Examples

One embodiment of the present invention was described above, but the present invention is not limited to this and can be modified as described below, for instance.

In the embodiment described above, a composition is described in which the constant-velocity joint 1 has a tripod configuration, but the form of the joint may be modified suitably. For example, the joint may be changed to a double-offset joint, a cross groove joint, or a fixed joint. Of these, if the constant-velocity joint 1 is a cross groove joint, then the sliding grooves of the outer ring are inclined in the round circumferential direction with respect to the axis line (axial direction), and the balls (sliding elements) of the trunnion assembly slide along the sliding grooves, in other words, in an oblique direction with respect to the axis line.

In the embodiment described above, a composition is explained in which drive force is input to the outer ring 10, but it is also possible to adopt a composition in which the drive force is input to the shaft member 40.

In the embodiment described above, a composition is explained in which the shaft member 40 extends in a horizontal direction, but apart from this it is also possible to adopt a composition where the shaft member 40 extends in an oblique direction, for instance.

What is claimed is:

1. A bearing structure comprising:
a shaft member which rotates and extends in a horizontal direction;
a bearing which fits externally onto the shaft member;
a ring-shaped member which is arranged on an outer radial side of the bearing;
a ring-shaped elastic body which is made of an elastic material, is fixed to an outer ring and encloses the ring-shaped member; and
a cover member which is fixed to the shaft member and rotates in unison with the shaft member, wherein the shaft member is supported rotatably by the outer ring via the bearing, the ring-shaped elastic body includes, on one side in an axial direction, a rib which extends inward in the radial direction and extends in a circumferential direction so as to seal off a first gap formed between the cover member and the ring-shaped member, a second gap is formed between an inner radial end of the rib and the cover member, the cover member extends outward in the radial direction and extends in the circumferential direction so as to cover the rib and the second gap on the one side of the ring-shaped elastic body, and a cutout is formed in a portion of the rib, said cutout extending in the circumferential direction.

2. The bearing structure according to claim 1, wherein an inner circumferential surface of the ring-shaped elastic body in the portion where the cutout is formed has a downward gradient towards the one side, in a sectional side view.

* * * * *